Dec. 4, 1928.
E. A. KING
TRAILER
Filed Jan. 28, 1927
1,694,267
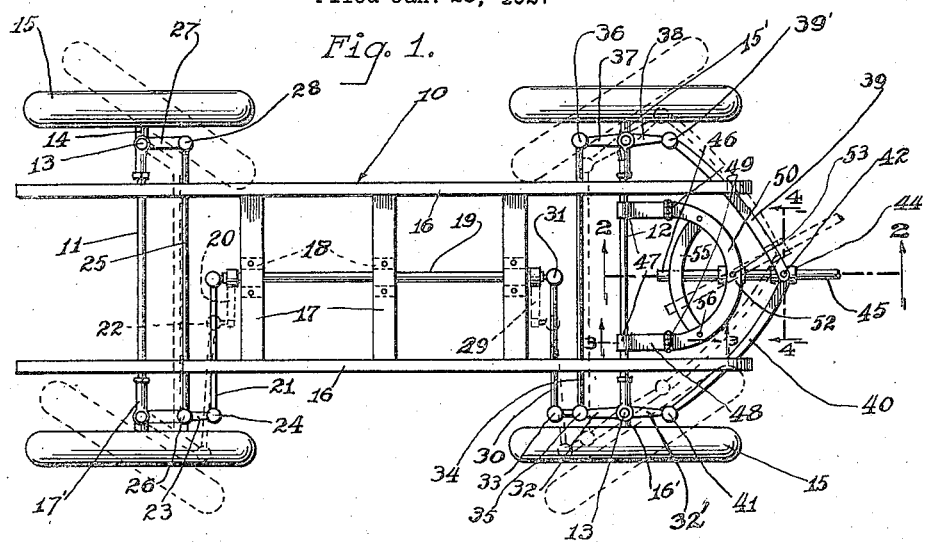
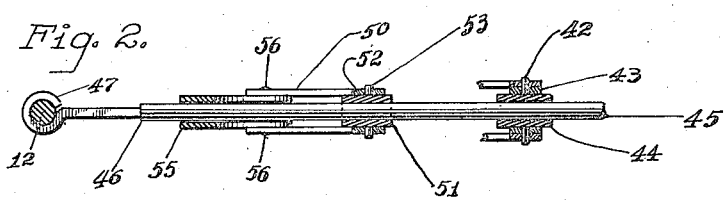
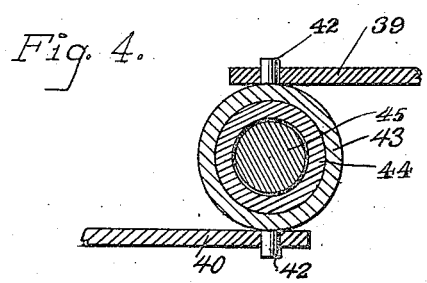
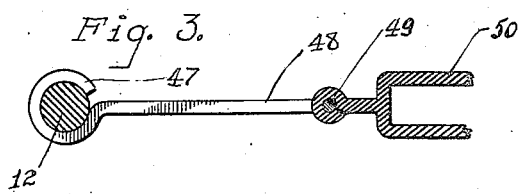
Emory A. King
INVENTOR
BY Victor J. Evans
ATTORNEY Patented Dec. 4, 1928.

1,694,267

UNITED STATES PATENT OFFICE.

EMORY A. KING, OF CORYDON, IOWA.

TRAILER.

Application filed January 28, 1927. Serial No. 164,289.

This invention relates to certain novel improvements in trailers and has for its principal object the provision of an improved construction of this character which will be highly efficient in use and economical in manufacture.

A further object of the invention is to issue the turning of the wheel axles of the trailer in opposite directions when the vehicle is traveling on a curve and to eliminate the usual binding of the wheel axle turning mechanism when operable to turn the wheels in said opposite direction and also to avoid undue strain on the ridge or connection between the wheel axles consequent upon any of the carrying wheels engaging an obstruction or entering a rut or ditch and to assure the ready and easy turning of the wheel bearing axles by effective guiding means.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a plan view with the body of the trailer removed;

Fig. 2 is a fragmentary sectional detailed view taken substantially on line 2—2 of Fig. 1;

Fig. 3 is a fragmentary sectional detailed view taken substantially on line 3—3 of Fig. 1; and Fig. 4 is a fragmentary sectional detail view taken substantially on line 4—4 of Fig. 1.

In the drawing 10 indicates the chassis of the trailer carrying the usual axles 11 and 12 through the medium of any approved spring and shackle connections (not shown). The axles 11 and 12 have pivotally connected thereto as at 13 the stud axles 14, 15', 16', and 17' which carry the wheels 15.

Secured to the side bars 16 of the chassis 10 are transverse plates 17. Carried by these plates 17 are bearing blocks 18 which rotatably support a rocker shaft 19.

The rear end portion of this rocker shaft 19 has secured thereto a depending arm 20. This arm 20 has connection to a push rod 21 through the medium of a ball and socket connection 22. The opposite end portion of the push rod 21 is connected to an arm 23 through the medium of a ball and socket connection 24. This arm 23 is formed as an integral part of the stud axle 17'.

The arm 23 is connected to one end portion of a connecting rod 25 through the medium of a ball and socket connection 26, said connection being intermediate the end portions of the arm 23. The opposite end portion of the connecting rod is connected to an arm 27 formed as an integral part of the stud axle 14. This connection is likewise accomplished through the medium of a ball and socket connection 28.

From the description thus far set forth it will be manifest that when the rocker arm 19 is rocked in one direction pivotal movement will be imparted to the stud axles 14 and 17' to pivot the wheels 15 in unison in the same direction.

The forward end portion of the rocker shaft 19 carries a depending arm 29 which has its lower end portion connected to one end portion of a push rod 30 through the medium of a ball and socket connection 31. The outer end portion of this push rod 30 is connected to an arm 32 through the medium of a ball and socket connection 33. This arm 32, formed as an integral part of the stud axle 16' has connected intermediate its end portion and its juncture with the stud axle 16' a connecting rod 34. This connection is accomplished through the medium of a ball and socket connection 35 and in the present instance the opposite end portion of the push rod 34 is connected, through the medium of a ball and socket connection 36 to an end portion of an arm 37 formed as an integral part of the stud axle 15'. Opposite the arm 37 is a forwardly extending arm 38 which is connected to one portion, through the medium of a ball and socket connection 39' to an arm 39. Opposite the arm 32 is a forwardly extending arm 32' which is connected to a bar 40 which cooperates with the bar 39 for pivoting stud axles in a manner hereinafter set forth. This connection is accomplished through the medium of a ball and socket connection 41.

I have found from experience that in order to assure accurate turning of the wheels it is essential to provide the arms 27, 23, 32, 37, 38, and 32' of equal lengths from the vertical centers of the pivots 13. When this is done it will be manifest that the pivotal movement of the arms 38 will be equal to the pivotal movement of the arms 37 and this is also true of the arms 32 and 32'.

The bars 39 and 40 have their outer end portions disposed in overlapping relation and connected together through the medium of pins 42. These pins 42 are carried by a ring 43 driven upon a sleeve 44. This sleeve 44 is mounted upon a draw bar 45 for slidable movement longitudinally thereto. The draw bar 45 has its inner end portion 46 hingedly connected to the axle 12. This is accomplished by loosely mounting upon the axle bearing sleeves 47 which are formed as integral parts of arms 48. These arms 48 have hinged connection as at 49 to a yoke 50. This yoke 50 carries a sleeve 51 which is pivotally connected to the plates 52 of the yoke 50 through the medium of pins 53. The sleeve 51 is adapted for pivotal movement relative to the yoke 50 and the draw bar 45 is fixedly retained therein.

The inner end portion 46 of the draw bar is guided in its swinging movement through a guide structure 55 which comprises two super-imposed arcuated plates having end portions connected as at 56.

When the draw bar is swung in one direction the sleeve 44 will move forwardly longitudinally upon the draw bar and impart movement to the bars 39 and 40 to pivot the stud axles 15' and 16'. This pivotal movement of the stud axles 15' and 16' imparts rockable movement to the shaft 19' and this rockable movement of the shaft 19 will impart pivotal movement in an opposite direction to the stud axles 14 and 17'.

By providing the slidable connection between the bars 39 and 40 and the draw bar 45 it will be manifest to those skilled in the art that binding effect between these parts is greatly eliminated and this slidable connection permits the draw bar to return to its normal position without imparting strain to the turning mechanism herein described.

By providing a rockable shaft which imparts the pivotal movement to the rear complementary stud axles 14 and 17' it will be manifest that vibratory movement to this shaft or wabbling of the wheels during turning movement is practically eliminated.

While I have illustrated and described the preferred form of construction for carrying my invention into effect, this is capable of variation and modification, without departing from the spirit of the invention, I, therefore, do not wish to be limited to the precise details of construction set forth, but desire to avail myself of such variations and modifications as come within the scope of the appended claims.

Having thus described my invention what I claim as new and desire to secure by Letters Patent is:

1. The combination with a vehicle chassis, axles carried by the chassis, pairs of wheel bearing stud axles pivotally carried by said first mentioned axles, and a draw bar, of a member carried by the draw bar for movement longitudinally of the draw bar, means connecting said member to one pair of said stud axles for imparting movement to the stud axles in a direction of movement of the draw bar, and means connecting said one pair of stud axles to the other pair of stud axles for imparting movement to said other pair of stud axles in an opposite direction to the movement of said one pair of stud axles.

2. The combination with a vehicle chassis, axles carried by the chassis, pairs of wheel bearing stud axles pivotally carried by said first mentioned axles, and a draw bar, of a member carried by the draw bar for movement longitudinally of the draw bar, means connecting said member to one pair of said stud axles for imparting movement to the stud axles in a direction of movement of the draw bar, and means connecting said one pair of stud axles to the other pair of stud axles for imparting movement to said other pair of stud axles in an opposite direction to the movement of said one pair of stud axles, said last mentioned means including a rocker member carried by the chassis, push rods, depending arms carried by opposite end portions of the rocker member, and ball and socket connections between opposite end portions of the push rods and depending arms and opposite corresponding stud axles of each pair of said stud axles.

3. The combination with a vehicle chassis, axles carried by the chassis, pairs of wheel bearing stud axles pivotally carried by said first mentioned axles, and a draw bar, of a member carried by the draw bar for movement longitudinally of the draw bar, means connecting said member to one pair of said stud axles for imparting movement to the stud axles in a direction of movement of the draw bar, and means connecting said one pair of stud axles to the other pair of stud axles for imparting movement to said other pair of stud axles in an opposite direction to the movement of said one pair of stud axles and means providing connection between the draw bar and one of said first mentioned axles permitting horizontal and vertical movement of the draw bar relative to said one of the axles.

4. The combination with a chassis of a vehicle, an axle carried by the chassis, a draw bar, and stud axles pivotally carried by said axle, of arms extending laterally from the stud axles, a member mounted on the draw bar for movement relatively of the draw bar, oppositely arranged bars having corresponding end portions pivotally connected to said member and opposite end portions pivotally connected to the arms, and means connecting the draw bar to the axle to permit horizontal and vertical movement of the draw bar.

5. The combination with a chassis of a vehicle, an axle carried by the chassis, a draw bar, and stud axles pivotally carried by said axle, of arms extending laterally from the stud axles, a member mounted on the draw bar for movement relatively of the draw bar, oppositely arranged bars having corresponding end portions pivotally connected to said member and opposite end portions pivotally connected to the arms, and means connecting the draw bar to the axle to permit horizontal and vertical movement of the draw bar, said means including oppositely disposed arms having pivotal connection to the axle, a yoke having hinged connection to the arms, means providing slidable and pivotal connection to the draw bar, and means operable on the inner end portion of the draw bar for guiding said draw bar in said vertical and horizontal movement.

6. The combination with a chassis of a vehicle, axles carried by the chassis, pairs of wheel bearing stud axles pivotally carried by said first mentioned axles, and a draw bar of opposite laterally extending aligned arms carried by each stud axle of one of said pairs of stud axles, said arms being of equal length, arms carried by each stud axle of the other pair of stud axles and of a length equal to the length of said first mentioned arms, a connecting rod connecting said second mentioned arms together, a connecting rod connecting corresponding arms of said second mentioned arms together, a rockable shaft carried by the chassis, depending arms carried by opposite end portions of the shaft, push rods having connection to the lower end portions of the depending arms, means connecting one of the push rods to one of said second mentioned arms, means connecting the other push rod to one of the lateral arms of said first mentioned arms, cooperating members having corresponding end portions connected to corresponding arms of said first mentioned arms, means slidably carried by the draw bar for connecting opposite corresponding end portions of said cooperating members to the draw bar, and means connecting the draw bar to one of said axles for permitting vertical and horizontal movement of the draw bar.

In testimony whereof I affix my signature.

EMORY A. KING.